United States Patent Office 3,093,545
Patented June 11, 1963

3,093,545
THERAPEUTIC IRON-DEXTRAN PREPARATIONS
Robert J. Westfall, Kankakee, and Sheldon H. Lewis, Park Forest, Ill., assignors, by mesne assignments, to Armour Pharmaceutical Company, a corporation of Delaware
No Drawing. Filed Aug. 29, 1960, Ser. No. 52,332
3 Claims. (Cl. 167—68)

This invention relates to iron preparations for therapeutic purposes, and more particularly to an improved complex of iron and dextran and to the manufacture of such improved complex.

There have been made available complexes of iron and dextran suitable for injection in the treatment of iron deficiency anemia, but these available iron-dextran complexes provide certain disadvantages which it is the object of this invention to overcome.

There is contemplated by this invention, as an iron preparation for theapeutic purposes, an aqueous solution of a complex of iron and dextran, which complex demonstrates an average intrinsic viscosity at a temperature of 25° C. of about 0.025 to 0.25, which complex demonstrates in aqueous solution at an iron concentration of 100 mg. per ml. and a temperature of 25° C. a kinematic viscosity of less than 45 centistokes, which complex is substantially free from dextran degradation products having molecular weights of less than about 300, which complex demonstrates on intravenous administration to mice an $LD_{50}$ of at least 1500 mg. Fe per kg., and which complex demonstrates on intramuscular injection into the thigh of a rabbit at a concentration of 20 mg. per kg. of body weight less than about 20% of residual iron at the injection site after seven days.

This improved iron-dextran product can be prepared by a method which involves forming an aqueous solution having a pH of less than about 2.3 of dextran having an average intrinsic viscosity of about 0.025 to 0.25 and at least one water soluble ferric salt, which aqueous solution contains less than about 5% (weight/volume) of iron, and adjusting such aqueous solution to a pH of from 3.5 to 5.0 over a period of at least about one-half hour to obtain the iron-dextran complex, provided that during the formation of the iron-dextran complex such aqueous solution is maintained at a temperature of less than about 70° C.

In obtaining this improved iron-dextran complex, it is important to control the rate of adjusting the pH of the aqueous solution of iron and dextran to substantially eliminate the formation of undesirable iron-dextran complexes. Although it is especially envisioned that an interval controlled amount of water-soluble alkali will be combined with the aqueous solution of iron and dextran by continuous metering to achieve the desired adjustment in the pH thereof to obtain the iron-dextran complex, it has been found that this improved iron-dextran complex may be obtained by a somewhat irregular adjustment of the aqueous solution of iron and dextran to the desired pH, providing that such adjustment in pH is carried out over a period of at least one-half hour.

However, still better results are achieved when the adjustment of the aqueous solution of iron and dextran to the desired pH is carried out over a period of at least about one hour.

Further, it has been discovered that certain of the advantages accruing from the therapeutic employment of this iron-dextran complex result from the prevention of dextran degradation by pyrolysis during the formation of the iron-dextran complex by the process of this invention. Accordingly, although this object may be accomplished by carrying out the process at a temperature of less than 70° C., better results are obtained when the formation of the iron-dextran complex is obtained at a temperature of from about 25 to 45° C., and especially desirable in the formation of this improved iron-dextran complex is a temperature of from about 30 to 35° C. On the other hand, it will be appreciated that in order to obtain efficient reaction between the iron and dextran in the formation of this iron-dextran complex the temperature of the aqueous solution of iron and dextran should be maintained at a temperature of at least about 15° C. during the formation of such complex.

As indicated hereinbefore, the formation of this improved iron-dextran complex is obtained by adjusting the aqueous solution of iron and dextran having a pH of less than about 2.3 to a pH of from 3.5 to 5.0. However, better results are achieved when such aqueous solution is adjusted to a pH of from about 4.0 to 4.5 in the formation of this iron-dextran complex. Moreover, especially desirable results are provided by combining with the aqueous solution of iron and dextran having a pH of less than about 2.3 about 0.85 to 0.95 equivalent of a water-soluble base per equivalent of ferric anion contained in the aqueous solution of iron and dextran. Accordingly, in this especial aspect of the invention adjustment of the aqueous solution of iron and dextran to the desired pH is accomplished by combining therewith a controlled neutralizing amount of base.

There is further contemplated by this invention treatment of the aqueous solution of the iron-dextran complex obtained by the foregoing process to remove from the aqueous phase thereof the soluble salts formed in the reaction between the water-soluble ferric salt and the dextran. Although the separation of these soluble salts from the aqueous solution of the iron-dextran complex may be obtained by known procedures such as dialysis, especial advantages in connection with the process of this invention are provided by a special precipitation method of removing such soluble salts to be outlined in detail hereinafter.

In a preferred practice of preparing this improved iron-dextran complex, the dextran is combined in water with at least one ferric salt of a strong univalent acid, for example, ferric salts of such acids as hydrochloric, nitric, perchloric and trichloracetic. Then, the resulting aqueous solution, which demonstrates a pH of less than about 2.3, is alkalinized to the desired pH by combining therewith, on an interval controlled, continuous metering basis over a period of at least one-half hour, a water-soluble alkali, such as alkali metal hydroxide, ammonium hydroxide and tetramethyl ammonium hydroxide, although better results are obtained with alkali metal carbonates and bicarbonates. It will be understood that the foregoing pH adjustment is carried out at the specified temperature to substantially eliminate degradation of the dextran by pyrolysis.

After the iron-dextran complex has been formed in aqueous solution by the foregoing reaction, the soluble salts in the aqueous phase thereof may be removed by a procedure which involves combining such aqueous solution with a water-miscible alcohol, preferably ethanol, or acetone to precipitate in the resulting mixture the iron-dextran complex, and separating the resulting precipitate from the supernatant liquid by decantation, filtration or centrifugation.

The iron-dextran complex substantially free from soluble salts, as obtained by the foregoing process, may be reconstituted in a pharmaceutical carrier, especially an aqueous solution, for therapeutic purposes.

Although it is recognized that the aqueous solution of the iron-dextran complex contemplated by this invention does not meet the strictest modern usage of the term "solution" in that it is probably separable by ultracentrifugation and ultrafiltration, such aqueous solution does meet the conventional chemical and physical requirements of the solution, and consequently for the purposes of this invention it is desirable to refer to such product as an "aqueous solution."

The following examples will serve to further elaborate the specific details of this invention.

Example I

The following method has been employed in preparing the improved iron-dextran complex of this invention:

The equipment utilized in this process included a 150 gallon glassed steel reaction tank (Pfaudler) having a double jacket serviced with steam and coolant, equipped with a variable speed agitator and an adjustable baffle having three blades. There was vertically suspended in the tank a pipe having an internal diameter of one inch and having in the portion thereof inserted in the tank two perforations in the sides thereof, each perforation having a diameter of 1 mm.; this pipe was positioned at the periphery of the tank on the side opposite the baffle. This pipe was connected on the outside of the tank, by suitable valves, with a 50 gallon, open-head tank, referred to hereinafter as the "sodium carbonate head tank," and with a 30 gallon, open-head tank, referred to hereinafter as the "distilled water head tank," to provide a gravity-feed system from the head tanks into the reaction tank. The bottom of the reaction tank is of conventional inverted conical configuration having a pipe leading from its apex through a two inch glass lined valve into a precipitation tank disposed beneath the reaction tank. The precipitation tank may be of any convenient size but large enough to contain the material introduced thereunto. For purposes of the present practice, a 250 gallon capacity is adequate.

There was introduced into the reaction tank 72 liters of pyrogen-free distilled water, 10.03 liters of an aqueous solution of ferric chloride containing 19.96% of iron (weight/volume) equivalent to 2000 gms. of iron, and 18.6 liters of an aqueous solution of 5000 gms. of dextran having an average intrinsic viscosity of 0.063.

The sodium carbonate head tank was filled with a 0.30 M aqueous sodium carbonate solution. Then, a total of 171.2 liters of the sodium carbonate solution was metered into the reaction tank, while maintaining the aqueous solution of iron and dextran at a substantially constant temperature and under controlled agitation.

The following data was obtained in the course of the reaction:

| Reaction time (min. and sec.) | Increment volume of carbonate sodium solution added (liters) | pH of reaction solution | Temperature of reaction solution, °C. | Agitation speed r.p.m. |
|---|---|---|---|---|
| 0 | 0 | 1.25 | 31 | 195 |
| 27′15″ | 13.4 | (*) | (*) | (*) |
| 31′45″ | 6.7 | (*) | (*) | (*) |
| 41′45″ | 6.7 | 1.80 | 31.0 | 190 |
| 53′0″ | 6.7 | (*) | (*) | (*) |
| 64′15″ | 6.7 | (*) | (*) | (*) |
| 75′0″ | 6.7 | (*) | (*) | (*) |
| 86′45″ | 6.7 | 1.95 | 31.5 | 190 |
| 98′0″ | 6.7 | (*) | (*) | (*) |
| 109′15″ | 6.7 | (*) | (*) | (*) |
| 120′45″ | 6.7 | (*) | (*) | (*) |
| 132′0″ | 6.7 | 1.95 | 32.5 | 190 |
| 145′0″ | 6.7 | (*) | (*) | (*) |
| 156′0″ | 6.7 | (*) | (*) | (*) |
| 169′0″ | 6.7 | (*) | (*) | (*) |
| 182′0″ | 6.7 | 2.00 | 33.0 | 188 |
| 194′30″ | 6.7 | (*) | (*) | (*) |
| 207′0″ | 6.7 | (*) | (*) | (*) |
| 222′30″ | 6.7 | 2.10 | 34.5 | (*) |
| 232′0″ | 6.7 | 2.15 | 34.5 | 185 |
| 244′30″ | 6.7 | 2.15 | 34.5 | 185 |
| 257′15″ | 6.7 | 2.25 | 34.5 | 185 |
| 286′15″ | 15.0 | 2.60 | 34.5 | 185 |
| * | 1 | 2.65 | 34.5 | |
| * | 1 | 2.75 | (*) | (*) |
| * | 1 | 2.85 | (*) | (*) |
| * | 1 | 3.00 | 34.5 | 185 |
| * | 1 | 3.20 | (*) | (*) |
| * | 1 | 3.50 | (*) | |
| * | 1 | 3.75 | 34.5 | 185 |
| * | 1 | 4.05 | (*) | (*) |
| 307′15″ | 1 | 4.40 | (*) | (*) |

*Signifies no reading taken.

The resulting aqueous solution of the iron-dextran complex, in the amount of 271.83 liters, was dropped from the reaction tank into the precipitation tank where to it was added 580 liters of 95% 3A alcohol (methanol-denatured ethanol), while maintaining constant agitation in the tank. In this precipitation there was obtained a fast-settling, medium coarse, medium dark brown granules of precipitate. After about 30 minutes the precipitate had settled such that the supernatant liquid could be decanted by pumping from the tank. Then, the precipitate remaining in the tank was washed with 115 liters of a 65% aqueous ethanol solution; this washing operation was repeated twice. The washed precipitate was removed from the precipitation tank and the residual supernatant liquid was separated therefrom by vacuum filtration.

A portion of the resulting sand was dehydrated and subjected to analysis. The results demonstrated, on a dry basis, an iron content of 30.7%.

This iron-dextran complex was reconstituted in water at a concentration of 100 mgs. of iron per ml. The following analytical results were obtained with the reconstituted product:

Total solids (weight/volume) _____ 30.86%.
Iron (weight/volume) _____ 9.89%.
Chloride (weight/volume) _____ 1.13%.
pH _____ 5.65%.
Phenol _____ 0.49%.
Kinematic viscosity (centistokes) ___ 5.3.
$LD_{50}$ _____ 3500 mg. Fe/kg.
Pyrogen _____ +0.2° C.
Rabbit absorption (visual estimate). <20% Fe retained.
Physical stability at 100° C _____ >56 hours, p.p.t.

It will be apparent that the foregoing product demonstrated a desirably low viscosity at a high iron concentration, a low toxicity, desirable absorption properties, and non-pyrogenicity.

There may be employed in preparing this iron-dextran complex any dextran having an average intrinsic viscosity of 0.025 to 0.25 which is suitable for administration to animals and human beings. By dextran is meant the metabolic product of a certain group of bacteria, of which the most prominent species presently known is *Leuconostoc mesenteroides*. Although the dextran utilized in this process may be advantageously of the foregoing average intrinsic viscosity, significantly better results are obtained when the dextran has an average intrinsic viscosity of about 0.050 to 0.070.

The term "kinematic viscosity" refers to the measurement of viscosity obtained by the direct reading of a viscosimeter. On the other hand, the term "intrinsic viscosity" is a conventional expression of the relationship of concentration and viscosity, while the employment of the term "average" intrinsic viscosity is desirable because there is usually involved in available dextran preparations molecules of dextran having different molecular weights.

The iron-dextran complex of this invention should contain at least 16% by weight of iron. However, it is an especial advantage of this invention that iron-dextran complexes can be obtained with an iron content of at least 26% by weight and even as high as 34% by weight.

Another especial feature of this invention is the provision of iron-dextran complexes containing less than 20% by weight of hydroxide, including oxides. Moreover, by the process of this invention iron-dextran complexes can be obtained having an hydroxide content of less than 5% by weight, and even products substantially free from hydroxide. By "hydroxide," for the purposes of this invention, is meant the amount of material determined by subtracting from the total solids the amounts of iron-dextran and salt present in the iron-dextran complex.

Furthermore, this iron-dextran complex not only is capable of being reconstituted in aqueous solution at a concentration of 100 mg. of iron per ml. to obtain a product demonstrating a kinematic viscosity of less than 45 centistokes, but such iron-dextran complexes can be obtained demonstrating a kinematic viscosity of less than 20 centistokes and even less than 10 centistokes.

As indicated hereinbefore, the iron-dextran complex of this invention demonstrates, on intravenous toxicity measurements in mice, an $LD_{50}$ of at least 1500 mg. Fe per kg. However, there has been obtained by this process iron-dextran products having an $LD_{50}$ of greater than 2500 mg. Fe per kg., and oftentimes in excess of 3000 mg. Fe per kg.

The absorption properties of this iron-dextran complex can be determined by a method involving the injection of an aqueous solution of the iron-dextran complex into New Zealand white male rabbits, in good health, and weighing 1500 to 2500 gms. In this analytical procedures, the iron-dextran solution, in the amount of 20 mg. of iron per kg. of rabbit is injected into the muscle of one of the hind legs of a rabbit. Seven days after the injection the rabbits are sacrificed, and the muscles into which the iron-dextran complex was injected are excised for examination. The amount of residual iron in the injected muscle, as compared with the uninjected muscle of the other hind leg, is determined chemically by the conventional 2,2'-bipyridine method. The iron-dextran complex of this invention demonstrates, by this analytical procedure, less than 20% of iron at the site of injection after seven days. Moreover, such iron-dextran complexes may be obtained which demonstrate less than 15% of residual iron at the site of injection after seven days, and even as low as 1–2% of residual iron at the site of injection after seven days.

Although, in the process of preparing this iron-dextran complex, especial advantages are obtained in combining with an aqueous solution of dextran and a water-soluble ferric salt a suitable alkali to obtain the desired pH adjustment, this iron-dextran complex may be obtained by first combining the water-soluble alkali and the dextran in the desired amounts, and then combining the water-soluble ferric salt with the resulting solution.

Moreover, in carrying out the process of this invention it is desirable, in applying the special precipitation procedure for removing soluble salts from the aqueous solution of the iron-dextran complex, to employ as the alkali and adjusting pH of the reaction solution, a water-soluble alkali which forms, on reaction with the anion of the ferric salt a salt which is soluble in the resulting mixture of alcohol or acetone and water.

This iron-dextran complex is useful, in humans or in animals, but especially in domestic animals, either orally or parenterally in therapeutic circumstances in which iron administration is desirable. However, especially desirable results are obtained by the intramuscular or subcutaneous administration of an aqueous solution of this iron-dextran complex for hematopoietic purposes.

While in the foregoing specification various embodiments of this invention has been described in considerable detail for the purpose of illustration, it will be apparent to those skilled in the art that this invention is susceptible to other embodiments and that many of these details can be varied widely without departing from the basic concept and spirit of the invention.

We claim:

1. An iron preparation for therapeutic purposes, comprising an aqueous solution of a complex of iron and dextran, which complex demonstrates an average intrinsic viscosity at a temperature of 25° C. of from 0.025 to 0.25, which complex demonstrates in aqueous solution at an iron concentration of 100 mg. per ml. at a temperature of 25° C. a kinematic viscosity of less than 45 centistokes, which complex is substantially free from dextran degradation products having molecular weights of less than 300, which complex demonstrates on intravenous administration to mice an $LD_{50}$ of at least 1500 mg. Fe per kg., and which complex demonstrates, on intramuscular injection into the hind leg of a rabbit at a dose concentration of 20 mg. of iron per kg. of body weight, less than 20% residual iron at the injection site after seven days.

2. In a method of preparing an iron product for therapeutic purposes, the steps of forming an aqueous solution having a pH of less than about 2.3 of dextran having an average intrinsic viscosity of from 0.025 to 0.25 and at least one water-soluble ferric salt, and adjusting the resulting aqueous solution to a pH of from 3.5 to 5.0 over a period of at least one-half hour to obtain the iron-dextran complex, while maintaining said aqueous solution during the formation of the iron-dextran complex at a temperature of less than 70° C.

3. In a method of preparing an iron product for therapeutic purposes, the steps of combining in water dextran having an average intrinsic viscosity of from about 0.050 to 0.070 and a water-soluble ferric salt of a strong univalent acid, adjusting the resulting aqueous solution to a pH of from 4.0 to 4.5 over a period of at least one hour to obtain the iron-dextran complex, and removing from the resulting aqueous solution at least a substantial portion of the soluble salts therein.

References Cited in the file of this patent

UNITED STATES PATENTS

| | | |
|---|---|---|
| Re. 24,642 | London et al. | Apr. 28, 1959 |
| 2,820,740 | London et al. | Jan. 21, 1958 |

OTHER REFERENCES

Haddow et al.: J. Nat. Cancer Inst., 24: 1, pp. 109–147 (summary, p. 109 relied upon), January 1960.

"Imferon," 7 pp., brochure published by Lakeside Labs, copyright 1957.